US008326660B2

(12) United States Patent
Breitgand et al.

(10) Patent No.: US 8,326,660 B2
(45) Date of Patent: Dec. 4, 2012

(54) AUTOMATED DERIVATION OF RESPONSE TIME SERVICE LEVEL OBJECTIVES

(75) Inventors: David Breitgand, Modiin (IL); Ealan Abraham Henis, Rehovot (IL); John Michael Lake, Cary, NC (US); Onn Menahem Shehory, Yahud-Monosson (IL)

(73) Assignee: International Business Machines Corporation, Armonk, NY (US)

( * ) Notice: Subject to any disclaimer, the term of this patent is extended or adjusted under 35 U.S.C. 154(b) by 1368 days.

(21) Appl. No.: 11/969,927

(22) Filed: Jan. 7, 2008

(65) Prior Publication Data
US 2009/0177507 A1 Jul. 9, 2009

(51) Int. Cl.
*G06Q 10/00* (2012.01)
*G06F 15/16* (2006.01)
(52) U.S. Cl. .................................. 705/7.11; 709/236
(58) Field of Classification Search ................. 705/7
See application file for complete search history.

(56) References Cited

U.S. PATENT DOCUMENTS

| | | | |
|---|---|---|---|
| 7,309,008 B2 * | 12/2007 | Anderson et al. | 235/380 |
| 7,730,172 B1 * | 6/2010 | Lewis | 709/224 |
| 2002/0091854 A1 * | 7/2002 | Smith | 709/236 |
| 2002/0198995 A1 | 12/2002 | Liu et al. | |
| 2003/0004848 A1 | 1/2003 | Hellerstein et al. | |
| 2006/0130042 A1 * | 6/2006 | Dias et al. | 717/168 |
| 2006/0176824 A1 * | 8/2006 | Laver et al. | 370/241 |
| 2008/0263535 A1 * | 10/2008 | Dias et al. | 717/168 |
| 2009/0164250 A1 * | 6/2009 | Hamilton et al. | 705/3 |

FOREIGN PATENT DOCUMENTS
WO WO0125877 A2 4/2001

OTHER PUBLICATIONS

"Employing Intelligent Agents to Automate SLA Creation", Jan. 1, 2007 to Halina Kaminski.*
H. Kaminski et al., "SLA automated negotiation manager for computing service", Proceedings. Joint Conference 8th IEEE International Conference on e-Commerce and Technology, 2006,pp. 4.

(Continued)

*Primary Examiner* — Garcia Adegarcia Ade
(74) *Attorney, Agent, or Firm* — F. Jason Far-hadian; Century IP Group

(57) ABSTRACT

A method for maximizing a utility of a service contract by optimizing target response time for a performance service level objective is provided. A set of criteria are provided to ensure that performance requirements for the service are met. The method comprises determining one or more usage windows for providing a service, wherein each usage window is associated with a performance requirement and a time period; extracting usage patterns for each usage window based on historical data provided from monitoring requests for service in each usage window; extracting response time per transaction associated with said requests based on historical data provided from monitoring responses provided to said requests in each usage window; and calculating optimal probability for breach in each usage window (Pi) and determining the associated target response time, based on the usage pattern for each window and the response time per transaction.

20 Claims, 5 Drawing Sheets

OTHER PUBLICATIONS

J. Sauve et al., "SLA design from a business perspective", Lecture Notes in Computer Science (including subseries Lecture Notes in Artificial Intelligence and Lecture Notes in Bioinformatics), v 3775 LNCS, Ambient Networks—16th IFIP/IEEE International Workshop on Distributed Systems: Operations and Management, DSOM 2005, Proceedings, 2005, p. 72-83.

Yuan Chen et al., "SLA Decomposition: Translating Service Level Objectives to System Level Thresholds", HP Laboratories Palo Alto, HPL-2007-17 HP, Internal Publication.

J. Sauve et al., "Optimal design of E-commerce Site Infrastructure from a Business Perspective", Proceedings of the 39th Hawaii International Conference on System Sciences, 2006.

* cited by examiner input:
1. Usage windows: $\overline{W} = (W_1, ..., W_N)$;
2. $Portion$;
3. $\overline{B} = (b_1, ..., b_N)$, $\overline{S} = (s_1, ..., s_N)$;
4. Historical data on service usage: $(C_1, ..., C_N)$;
5. A sample of average response times: $\{R_k\}_n$ reported by RT compliance test for each $W_i$, sampled during the integration interval $[start, end]$ at frequency $f$ (see Figure 3).

algorithmic steps:
1. Calculate vector $(A_1, ..., A_N)$: $A_i = \frac{C_i}{C}$;
2. For each $W_i$, calculate: Empiric cumulative distribution functions $F_n^i(R)$ for sampled response times $R$;
3. Using results of Step 1, generate:
   3.1 Explicit utility function $U(P_1, ..., P_N)$;
   3.2 Constraints (see Section III)
4. Use optimizer to find vector $(P_1, ..., P_N)$ that maximizes $U(\cdot)$
5. For each $W_i$ compute:
   5.1 $RT_i = F_n^{i^{-1}}(1 - P_i)$ (see Section IV-A;
   5.2 Confidence band for $F_n^i(R)$;
6. Terminate.

output:
Vector $\overline{RT} = (RT_1, ..., RT_N)$ (see Step 5.1)
Maximal deviation from $Portion$ for the next evaluation period.

*FIG. 3*

AUTOMATED DERIVATION OF RESPONSE TIME SERVICE LEVEL OBJECTIVES

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

FIELD OF INVENTION

The present invention relates generally to information technology (IT) solutions and, more particularly, to optimizing the attainable response time for an IT solution by maximizing financial gain, minimizing violation of tolerated response time thresholds, and maximizing competitiveness in providing the solution.

BACKGROUND

With an IT Solution, the basic means to articulate business level objectives for a service application between the service provider and a service consumer is a service level agreement (SLA) that provides the parameters, objectives and acceptable thresholds related to performance, security, availability, business continuity, and response time requirements. The objectives typically are explicitly defined in service level objective clauses (SLOs). Whenever these objectives are not met by the service provider, a penalty is usually incurred for noncompliance.

Today, consideration and optimization of business goals and IT performance parameters is not concurrently handled by IT performance management tools but rather by human experts. That is, human experts are needed to set the IT level SLOs in an SLA in order to optimize business level objectives, including SLOs that cover the response time for an IT solution. Typically, response time SLO clauses define (i) target average response times of service for transactions; (ii) means for sampling average response time for verification of compliance with target values; (iii) sampling frequency; (iv) penalty terms and (v) compliance evaluation period.

Generally, if the target response times are met, no penalty is incurred on the service provider. Currently, a simple percentile analysis is used to identify an acceptable response time for a given IT solution. A cumulative distribution function $F_n$ may be computed for a historical response times sample of sufficiently large size n. This function may be applied to the level of compliance as specified in the response time SLO clause to yield the needed target response time.

Unfortunately, when setting target response time thresholds via percentile analysis, even though the total number of breaches detected during an evaluation period is within the allowed total number of breaches (i.e., within the "Breach Budget"), the SLO may be suboptimal from other business perspectives. In other words, the same transactions executed at different times (i.e., usage windows) during a business day may carry a different financial gain/loss for the service provider which is not taken into account using the simple percentile analysis.

Thus, optimization methods and systems are needed that can overcome the aforementioned shortcomings by observing and evaluating response time distribution across multiple usage windows of varying business importance.

SUMMARY

The present disclosure is directed to systems, methods and corresponding products that facilitate optimizing the target response time for an IT solution by maximizing financial gain, minimizing violation of tolerated response time thresholds, and maximizing competitiveness in providing the solution.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for maximizing a utility of a service contract by optimizing target response time for a performance service level objective is provided. A set of criteria are provided to ensure that performance requirements for the service are met. The method comprises determining one or more usage windows for providing a service, wherein each usage window is associated with a performance requirement and a time period; extracting usage patterns for each usage window based on historical data provided from monitoring requests for service in each usage window; extracting response time per transaction associated with said requests based on historical data provided from monitoring responses provided to said requests in each usage window; and calculating optimal probability for breach in each usage window (Pi) and determining the associated target response time, based on the usage pattern for each window and the response time per transaction.

Transaction usage windows are determined and usage counts and transaction response times are collected for each window. These data are used to construct empiric cumulative distribution functions (ECDF) of breaching a target response time threshold. A utility function is defined that represents the net gain of running the transactions, as function of the probability of target RT breach, and based on the historical usage counts and financial value of transaction success/failure. The utility is optimized subject to performance and other constraints, and the resulting optimized probabilities are translated into optimized target response times (for each usage window) by inverting the above ECDF relations.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

FIG. 3 is a pseudo-code of an exemplary ADSLO algorithm in accordance with one embodiment.

Features, elements, and aspects of the invention that are referenced by the same numerals in different figures represent the same, equivalent, or similar features, elements, or aspects, in accordance with one or more embodiments.

DETAILED DESCRIPTION OF PREFERRED EMBODIMENTS

Figure 1:
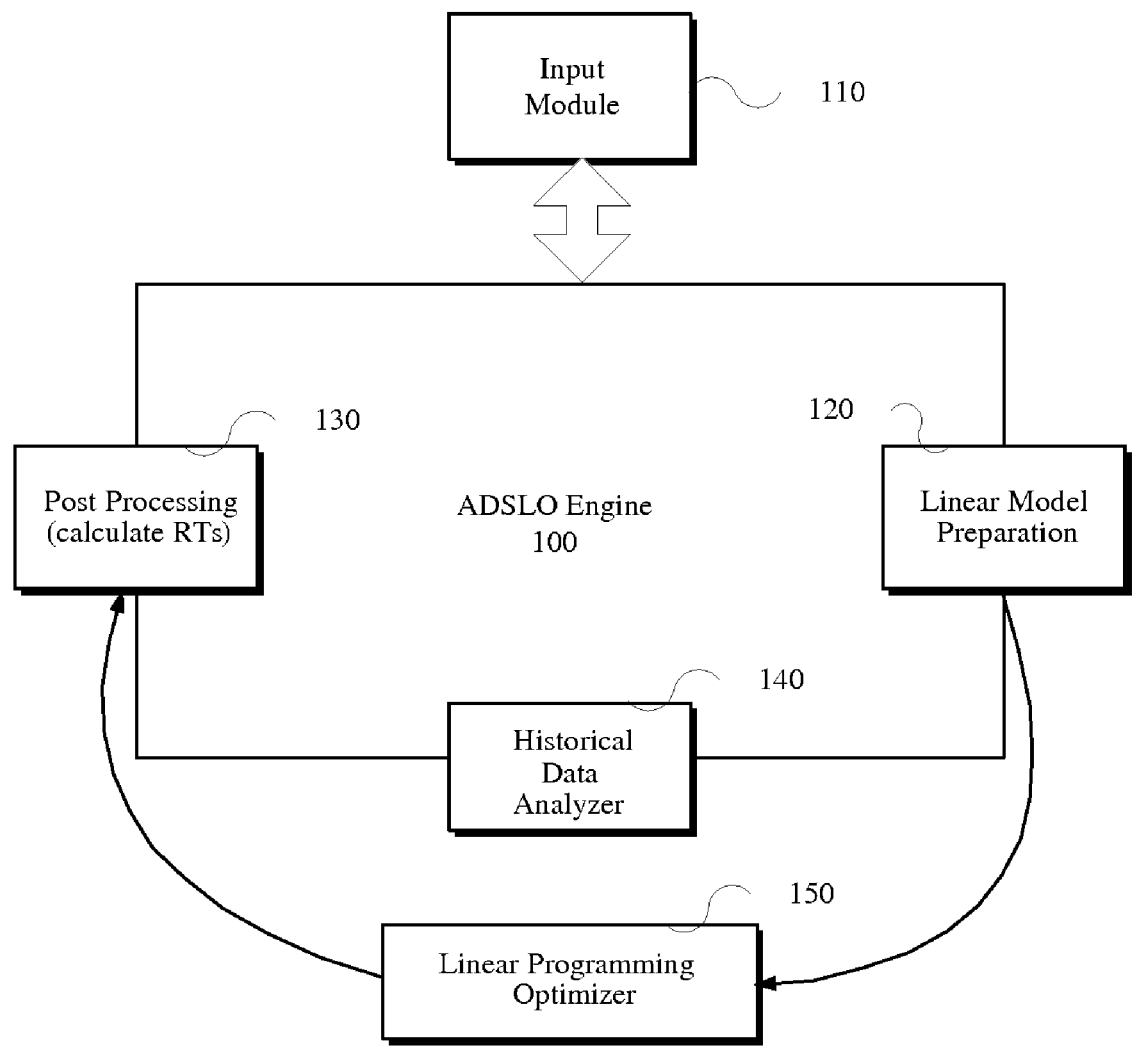
FIG. 1 illustrates an exemplary ADSLO prototype architecture in accordance with one or more embodiments.

The present disclosure is directed to systems and corresponding methods that facilitate optimizing target response times for a service provided throughout different time periods (e.g., usage windows), wherein a set of criteria are provided to ensure that performance requirements (e.g., breach budget) for the service are met.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

In accordance with one embodiment, the problem of target response time SLO derivation is defined as a linear optimization problem by deriving optimal target response time values for each identified usage window. Other parameters of a response time SLO, such as breach budget, are considered given and fixed and translate into a system of constraints. In one embodiment, for example, an optimization is implemented based on the financial impact of transactions meeting or missing their deadlines, as well as transactions usage trends and historical performance data.

The optimization process may include optimizing a utility function which captures the transaction's value for the service provider at different usage windows, and a prototypical implementation performs an extensive experimental and analytical evaluation. In certain embodiment, a computing system ("system") is configured to process the related values and parameters to determine the optimal conditions that satisfy the defined objectives for the optimization process.

In accordance with one aspect of the system, transaction usage (measured, for example, by number of invocations) is recorded during an SLA evaluation period, and patterns corresponding to different time windows (i.e., usage windows) during the business normal operation hours (e.g., daily hours) are identified. Existing SLA monitoring and management tools may be utilized to allow an administrator to divide an SLA evaluation period into N usage windows of possibly of various sizes.

Each window may have a different relative importance. For example, if most of the usage (e.g., 40%) occurs between 2 PM and 5 PM, this time window may be defined as "critical usage window." If between 1 AM to 6 AM there is almost no transaction activity, the window may be defined as "off time window," for example.

A user of the optimization method, in one embodiment, may define usage windows manually, or via an automatic process. History selection may be employed to filter out undesired periods (such as a holiday) which do not represent normal usage data. Once the usage windows are defined, historical usage patterns for each window may be extracted from the historical usage data. In an exemplary business environment, each transaction may have a financial impact on the business (e.g., a gain if the transaction succeeds and a loss if it fails). In the following, for the purpose of brevity we consider the timeliness of each transaction to determine the business financial loss or gain resulting from each transaction. It is noteworthy, however, that other parameters may be also considered to determine loss or gain.

In accordance with one aspect of the system, a transaction is considered as a failure if it misses its target deadline (i.e., target response time). Otherwise the transaction is considered a success. In some instances, the average per-transaction gain and loss values for different usage windows may be known. These values may be used as inputs to an optimization process that attempts to maximize the total value for the service provider. If absolute values are not available, relative values may be determined. For example, relative values may be provided by stating that the transaction value during the prime window is twice that during the normal window.

For example, a compliance evaluation period (also referred to as integration interval) of one week may be specified for the SLA and a measurement for checking response time compliance may run every 5 minutes. If so, 2016 measurements, for example, will be performed during the integration interval. If "Portion" denotes the level of compliance as specified in the response time SLO clause, a Portion equal to, 0:97 means that 97% of the tests (i.e., 1956) have to be successful, for example. This means that 97% of the tests have met their target RT values.

In one embodiment, a breach budget for the integration interval is defined as the fraction of allowed unsuccessful tests, and can be calculated by: 1−Portion. If the breach budget is violated, the SLA is considered breached and the service provider may have to pay a penalty. Accordingly, in one embodiment, a target response time (RT) may be set for each usage window to render some of the transaction executions as compliant with that target, while others breach that RT target. To fully specify the response time SLO clause definition, the IT manager needs to determine the target response times, for example, for each usage window, which will correspond to the required portion (portion is specified for the entire integration interval) with high probability.

Thus, according to one or more embodiments, given the transaction usage pattern, usage windows, financial gain/loss figures relating to transaction success/failure in each usage window, the system is implemented to find the target response time values for each usage window that will result in maximal gain for the business, subject to a pre-defined breach budget constraint and other business related factors. In accordance with one embodiment, when aggressive performance goals for the provided services are set, the breach budget may be fully exploited as provided in more detail below.

Table 1 below provides the exemplary notations that are used in the following to describe the invention with respect to one or more embodiments. It should be noted, however, that the exemplary language or notations are provided by way of example and as such the scope of the invention should not be construed narrowly as limited to such exemplary language.

TABLE 1

| Symbol | Definition |
| --- | --- |
| N | Number of usage windows |
| $W_i$ | Usage window i |
| $RT_i$ | Target response time for $W_i$ |
| $P_i$ | Probability that a transaction breaches its $RT_i$ in $W_i$ |

TABLE 1-continued

| Symbol | Definition |
| --- | --- |
| $s_i$ | Value gained if a transaction meets $RT_i$ in $W_i$ |
| $b_i$ | Loss incurred if a transaction breaches $RT_i$ |
| $C_i$ | Number of transaction executions in $W_i$ |
| C | Number of transaction executions during entire integration interval: $C = \sum_{i=1}^{N} C_i$ |
| $C_i^-$ | Number of transaction executions, which breached $RT_i$ in $W_i$ |
| $C_i^+$ | Number of transaction executions, which met $RT_i$ deadline in $W_i$ |
| $A_i$ | Relative usage pertaining to $W_i$: $A_i = \dfrac{C_i}{C}$ |
| RTA-SLO | Response Time SLO. See FIG. 3 |
| U(P̄) | Utility function: $U(P_1, \ldots, P_N) = \sum_{i=1}^{N} A_i(1-P_i)s_i - \sum_{i=1}^{N} A_i P_i b_i$ (see Section III for details) |

Let "test" be a measurement executed repeatedly to verify compliance with RT target values. Let Rj denote average response time of the business transaction measured by the test's invocation j. The invocation j of the test is successful in $W_i$ if $R_j <= RT_i$. The following provides the response time availability SLO (RTASLO) template, according to one embodiment:

RT compliance "test" is run with frequency [f]

Percent of successful invocation of "test" calculated over [integration_interval] may be >=[Portion]

In accordance with one embodiment, the automated derivation of RTASLOs problem is defined as follows: Given Portion, test, f, integration interval, historical usage pattern of the transaction: $C=C_1, \ldots, C_N$; $b_1, \ldots, b_N$, $s_1, \ldots, s_N$, and historical average response times reported by test, find $RT=RT_1, \ldots, RT_N$, which maximizes the total utility incurred by all transactions invocations during the integration interval. Usage counters C and average transaction response time reported by the RT compliance tests are random variables, for example.

Thus, solving the ADSLO problem provides useful suggestions on SLO design if no change point rendering the historical data obsolete occurs in next SLA evaluation periods. Provided that no change point occurs, target RTs obtained by solving the ADSLO problem is the optimal (within some margin error) RTA-SLO that the business service provider can use without changing the IT infrastructure. The margin error can be estimated for specific statistical confidence levels, as provided in more detail below. If a change point is detected, then newer data may be collected and the ADSLO optimization may be recalculated using the new data.

In one embodiment, $TC_i^+(RT_i)$ denotes a random function representing the number of successful RT compliance test invocations outcomes for usage window $W_i$. Provided that test invocations are performed independently (in practical terms—with sufficiently long time intervals between successive invocations), each invocation can be treated as an independent Bernoulli trial (e.g., $TC_i^+(RT_i) \rightarrow C_i^+(RT_i)$), for sufficiently large N. For the sake of brevity $RT_1, \ldots, RT_N$ is omitted from the $C_i^{+/-}$ notation, in accordance with one embodiment. Hence, the random function $C_i^+$ has a Binomial distribution $B_i(N; 1-P_i)$, where $P_i$ is the probability of transaction breaching $RT_i$ in $W_i$ for specific $RT_i$. Since $s_i$ and $b_i$ represent the gain and loss of a successful/failed transaction, the overall financial value $U_T$ may be provided by Equation 1, in accordance with one embodiment.

$$U_T(P_1(RT_1), \ldots, P_N(RT_N)) = \sum_{i=1}^{N} C_i^+ s_i - \sum_{i=1}^{N} C_i^- b_i \qquad (1)$$

The left term sums up the total financial value of successes whereas the right terms sums up all the losses due to transaction breaches. From $U_T$ we derive U, which is the utility per transaction. In one embodiment, the analysis is based on U. $RT_i$ may be omitted from the Pi notation for the sake of brevity. Since the probability of success is $1-P_i$ then:

$$C_i^+ = C_i(1-P_i). \qquad (2)$$

Similarly $$C_i^- = C_i P_i. \qquad (3)$$

Hence, $$U_T(P_1, \ldots, P_N) = \sum_{i=1}^{N} C_i(1-P_i)s_i - \sum_{i=1}^{N} C_i P_i b_i. \qquad (4)$$

Dividing both sides by the total transaction counts C, the per-transaction utility function U is provided by Equation 5:

$$U(P_1, \ldots, P_N) = \frac{U_T}{C} = \sum_{i=1}^{N} A_i(1-P_i)s_i - \sum_{i=1}^{N} A_i P_i b_i. \qquad (5)$$

In one embodiment, $U(P_1, \ldots, P_N)$ is expressed, for example, by the ADSLO input parameters $A_i$, $b_i$ and $s_i$. U may be optimized subject to three constraints, for example. The first constraint, provided by Equation 6, provides that the resulting optimized set of probabilities Pi maintains the required successful fraction of transaction runs Portion. The term $C_i P_i$ is the count of non-compliant transaction runs for $W_i$. The sum of all $C_i P_i$ divided by C is the fraction of non-compliant transactions throughout the integration interval. Hence:

$$\sum_{i=1}^{N} \frac{C_i P_i}{C} = \sum_{i=1}^{N} A_i P_i = 1 - \text{Portion} \qquad (6)$$

$$0 \le P_i \le 1 \qquad (7)$$

The second constraint, provided by Equation 8, sets an upper bound on the probability of breach in each usage window. This constraint makes it possible to define that no window will experience denial of service effects, even if it is less costly to breach the transaction SLO in that window. Levels such as 15% to 20% may be used for the upper bounds, for example.

$$0 \le P_i \le P_i^{Max} \le 1 \qquad (8)$$

Equation 9 represents the third constraint, in accordance with an exemplary embodiment. This constraint relates to fairness in distributing the breaches among the windows. In certain embodiments, no higher importance window (e.g., critical window) may have more than, for example, twice the probability of breach than a lower usage window (e.g., normal usage window). This constraint prevents the allocation of too many breaches to the high importance windows. If we order the windows in decreasing importance (importance of $W_i$ is greater than the importance of $W_i+1$) then:

$$P_i \leq 2P_{i+1} \quad (9)$$

To balance the third constraint, if two windows have equal gain/loss values, allocating breaches to the higher importance window is preferred. This consideration generates more aggressive target response times for the higher usage windows since normally they are of greater importance to the business. Note that to complete the solution of the ADSLO problem the $P_i$ function values obtained via maximizing $U(P_1(RT_1), \ldots, P_N(RT_N))$ may be converted into $RT_i$ values. Accordingly, a higher $RT_i$, results from a lower $P_i$ (i.e., probability of breaching $RT_i$). However, since the exact functional relationship between $P_i$ and $RT_i$ may be unknown, a percentile analysis of empirical cumulative distribution function may be used as provided in the following, exemplary embodiment.

FIG. 1 depicts the ADSLO prototype architecture, in accordance with an exemplary embodiment. As shown, an exemplary input module 110 accepts user input parameters and passes them to the ADSLO engine 100 for model preparation. ADSLO engine 100 may comprise a linear model preparation module 120, a post processing module 130 and a historical data analyzer 140. ADSLO engine 100, in one embodiment, adds the optimization constraints and prepares a corresponding matrix that is suited for linear programming optimization.

ADSLO engine 100 may pass the matrix to a linear programming (LP) optimizer 150 for probabilities optimization. The resulting optimized probabilities provided by the LP optimizer may be passed back to the post processing module 130 for post processing. The post processing module 130 translates (e.g., for each usage window) the optimized probabilities into optimal target response times. The results, in one embodiment, may be provided as output for review and analysis by a third party entity.

In an exemplary embodiment, an LP matrix in de-facto standard MPS format is provided, and the open source LP solver package called CLP is used to obtain $P_1(RT_1), \ldots, P_N(RT_N)$, which maximize the target utility function $U(P_1(RT_1), \ldots, P_N(RT_N))$. In the following one or more exemplary methods for obtaining $RT_i$ values from $P_i$ is provided, in accordance with one embodiment as illustrated in FIG. 2.

Figure 2:
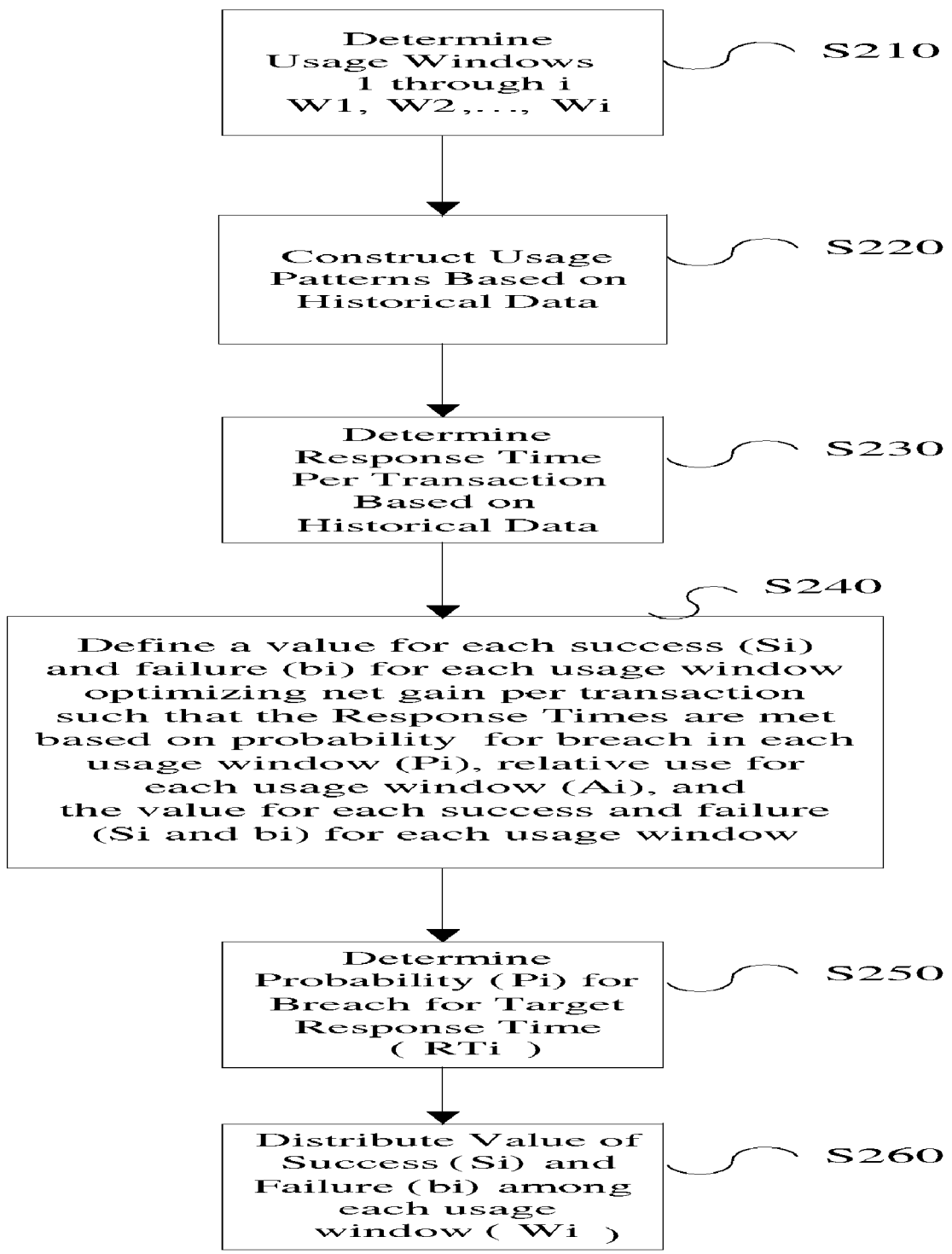
FIG. 2 is a flow diagram of a method for automated derivation of response time service level objectives, in accordance with one embodiment.

Referring to FIG. 2, a set of criteria may be provided to ensure that performance requirements (e.g., breach budget) for the service are met. In accordance with one embodiment, a method for optimizing target response times for a service comprises determining one or more usage windows 1 through i ($W_1, W_2, \ldots, W_i$) for providing a service (S210). Depending on implementation, each usage window may be associated with a performance requirement and a time period for one or more service requests received in each usage window.

In some embodiments, the system constructs usage patterns for each usage window (S220). The usage patterns may be constructed based on historical data provided from monitoring requests for service in each usage window. Response time per transaction may be also determined based on historical data provided from monitoring responses to the requests for service in each usage window (S230).

To optimize average net gain of running a transaction in usage window Wi, values for individual transaction success ($s_i$) and failure ($b_i$) for each usage window are needed. These values can be obtained from analyzing historical data at various levels (IT and business) (S240).

The target response time RTi for each usage window Wi is calculated in two steps. First, a utility function expressed in terms of Pi (probability of target response time breach in Wi) is constructed (S260). This utility function is based on the relative usage of transactions in each usage window ($A_i$) as extracted from historical data, and on the values for success and failure ($s_i$ and $b_i$) of running a transaction for each usage window (e.g., as provided by customer). The utility function reflects the average net gain of running transactions with a specific probability that the target response time will be breached (in a specific usage window). The utility function is optimized (S280) subject to performance requirements and to constraints imposed on the possible Pi solution (e.g., do not exceed the total breach budget) (S270). The resulting solution (vector of Pi) is used to calculate optimal target response times as follows.

In the second step the required optimal target response times are calculated from the probabilities of response time violations (obtained in the first step above). The optimal target response times RTi are calculated from the Pi (S290) via inverting the empiric cumulative distribution functions (ECDF) of the observed response times, which are constructed (for each usage window) from the historical data (S240, S250). This procedure is explained in further detail below.

Accordingly, $P_i$ is optimized so that the service can be provided with the highest number or percentage of failures allowed within the context of the target response time defined for each usage window without going over a predetermined breach budget for the entire service or service provided in each window. That is, in one or more embodiments, the optimization is performed by simulating a system based on values provided for $A_i$, $s_i$, and $b_i$ such that $P_i$ is maximized without breaching the overall or per usage window allowable target performance requirements.

FIG. 3 provides a pseudo-code of an exemplary ADSLO algorithm. Referring to algorithmic step 2, consider an Empiric Cumulative Distribution Function (ECDF) of a single window $W_i$ calculated in Step 2 of the ADSLO algorithm. For the sake of simplicity the i superscript from the $F^i_n(R)$ notation is omitted in the following discussion of this exemplary embodiment. Subscript n specifies that the function $F_n(R)$ is an empiric function, for example. In one embodiment, for a specific optimized value of $P_i$, $F^{-1}(1-P_i)$ is the target response time $RT_i$, since $1-P_i$ is the probability of successful RT compliance test outcome in $W_i$.

In the above analysis, $F_n(R)$ is a random function. A confidence band of this function can be computed using Kolmogorov's limiting statistics. More specifically:

$$\max\left(0, F_n(R) - \frac{t_\alpha}{\sqrt{N}}\right) < F(R) < \min\left(1, F_n(R) + \frac{t_\alpha}{\sqrt{N}}\right) \quad (10)$$

In this example, N denotes the size of the sample; $t_\alpha$ is obtained from $K(t_\alpha)=\alpha$, where $K(t_\alpha)$ is the Kolmogorov's limiting distribution of the absolute value of maximal deviation of the empirical CDF from the actual CDF, and $1-\alpha$ is the desired statistical significance level.

In one embodiment, service response time is not sampled very frequently. For example, in many commercial monitoring products, the frequency of sampling is limited to some commonly used values, such as once every 5, 15, and 30 minutes, for example. In an example embodiment, sampling is performed once every 15 minutes, for example. To determine the margin error for $F_n(R)$ at significance level (e.g., 5%), the tabulated Kolmogorov's function provides that $t_\alpha = 1.3581$.

Referring to Equation 10, for example, in a performance trace containing 733 data-points (e.g., approximately 7.6 days of operation), the margin of error is roughly 5.3%. Thus, ADSLO optimization suggestions will not be reliable enough for weekly SLA evaluation. This is because the weighted margin of error over all usage windows may exceed the allowed breach budget. If the length of the trace is increased to 7200 data points (e.g., corresponding to one month of operation), the margin error is reduced to 1.6%, for example.

In one embodiment, SLA compliance is evaluated on a monthly basis. Extending the trace's length even further is possible. However, if routine SLA evaluation periods are relatively short, and change points occur in the system at the frequency of once in a few weeks such traces may not be helpful. In one embodiment, depending on the desired level of statistical significance, tolerable margins of error, and available sampling frequency, different SLO compliance testing policy may be formulated.

Referring back to Equation 10, target response times $RT_1, \ldots, RT_N$ may be obtained that render optimal $P_1, \ldots, P_N$ (e.g., those obtained via the linear optimization) at the desired significance level. Further, from Equation 10, any $RT_i$ from the interval $(F_n^{low^{-1}}(P), F_n^{high^{-1}}(P))$ can serve as the target $RT_i$ value for the specified significance level, such that:

$$F_n^{low}(R) = \max\left(0, F_n(R) - \frac{t_\alpha}{\sqrt{N}}\right) \quad (11)$$

$$F_n^{high}(R) = \min\left(1, F_n(R) + \frac{t_\alpha}{\sqrt{N}}\right) \quad (12)$$

In a conservatively implemented embodiment, $RT_i = F_n^{high^{-1}}(P)$ may be preferred.

Referring to tables II through V below, the results of an experimental study according to one embodiment is provided. These results examine the ADSLO suggestions for optimal RT target values, and estimate accuracy of the suggested target values in the presence of moderate randomness (i.e., no change-points during the tests).

TABLE II

Summary of Workload Invariants

| | $A_i$ | $b_i$ ($) | data points |
|---|---|---|---|
| $W_1$ (critical) | 0.48168 | 10 | 784 |
| $W_2$ (prime) | 0.110949 | 9 | 285 |
| $W_3$ (normal) | 0.184485 | 9 | 366 |
| $W_4$ (off-peak) | 0.222865 | 6 | 449 |

TABLE III

Optimal Breach Budget Allocation

| Portion | $P_1$ | $P_2$ | $P_3$ | $P_4$ | Cost ($) |
|---|---|---|---|---|---|
| 0.9 | 0.0462 | 0.15 | 0.15 | 0.15 | 38254 |
| 0.95 | 0 | 0 | 0.0898 | 0.15 | 2327 |
| 0.99 | 0 | 0 | 0 | 0.0448 | 465 |

TABLE IV

SLO Compliance Study

| Portion | $RT_1$ | $RT_2$ | $RT_3$ | $RT_4$ | Compliance |
|---|---|---|---|---|---|
| 0.9 | 3668 | 3056 | 3362 | 3256 | 67% |
| 0.95 | 4342 | 9101 | 3572 | 3256 | 43% |
| 0.99 | 4342 | 9101 | 4688 | 3781 | 37% |

TABLE V

Breach Budget Deviation Study

| Portion | Avg. Attained Breach Budget | Stdev | Max. dev. | Predicted Max. Dev. |
|---|---|---|---|---|
| 0.9 | 0.1073 | 0.022 | 0.02 | 0.032 |
| 0.95 | 0.0511 | 0.012 | 0.03 | 0.032 |
| 0.99 | 0.0107 | 0.008 | 0.02 | 0.032 |

Table II summarizes the invariant parameters of our historical performance trace in the experimental study. The total number of non-zero data points in the trace is 1880. The total number of the data points is 10944=38 days×24×12 samples per hour. This difference is due to the inactivity periods. By way of example, four daily usage windows: $W_1$, critical (00:15:00-09:00:00), $W_2$, prime (09:00:00-12:00:00), $W_3$, normal (12:00:00-18:00:00), and $W_4$, off-peak (18:00:00-24:00:00) are defined. Transaction value distribution calculated in our experiments is shown in the $b_i$ column of Table II.

Table III shows optimal breach budget allocations across the usage windows for different breach budgets. The last column shows the total cost of breaches obtained by the ADSLO optimization for the entire integration interval, for example. As one can observe from Table III, the ADSLO optimization prefers less costly usage windows (in terms of loss of value due to breach) as long as it has sufficiently large breach budget and optimization constraint (e.g., as defined by Equation 8) is not violated. In our experiments we set this constraint at 15% per usage window, by way of example. This behavior is consistent with the administrator's intuition that the target response times should be set to protect usage windows producing more value.

Table IV and Table V summarize the results associated with estimation of compliance for optimal SLOs in the next SLA evaluation period. For each breach budget reported in the table we performed 100 ten-fold cross validation experiments as described above and calculated the actual compliance rate (see Equation 12). These results are shown in Table IV. Table V shows the average actual breach budgets attained in the experiments, standard deviation, and theoretically predicted maximal deviation at significance level 0.05 (using conservative Kolmogorov's confidence band) for the workload parameters summarized in Table II.

As shown, the margin of error is the same for all breach budgets since it depends on the significance level and sample size. Although the compliance tests results are apparently poor (e.g., compliance levels ranging from 67% to 37%), the deviations from the breach budget obtained for optimal RTi's are very small (see Table V). As Table V shows the relative error ranges from 2% to 7% of the breach budget, in this example. The standard deviation is also very small and consistent across all breach budgets. The average attained breach budget deviates from the target budget by the absolute error ranging from 0.0007 to 0.007, for example. These results are consistent with the theoretical predictions (see last column of Table V).

Accordingly, the Kolmogorov's confidence band is a conservative estimation of the maximal deviation from the required breach budget (since our distributions are discrete). The results of this study show that provided no change point occurs within the SLA evaluation period, target RT values derived via ADSLO optimization tool can be used at a very low risk for realistic time scales (e.g., monthly SLA evaluations). As such, in accordance with one embodiment, a conservative administrator may mitigate the overall SLA breach risk by decreasing Portion (i.e., increasing the breach budget) to cover the margin of error.

In different embodiments, the invention can be implemented either entirely in the form of hardware or entirely in the form of software, or a combination of both hardware and software elements. For example, ADSLO Engine 100 may comprise a controlled computing system environment that can be presented largely in terms of hardware components and software code executed to perform processes that achieve the results contemplated by the system of the present invention.

Figure 4:
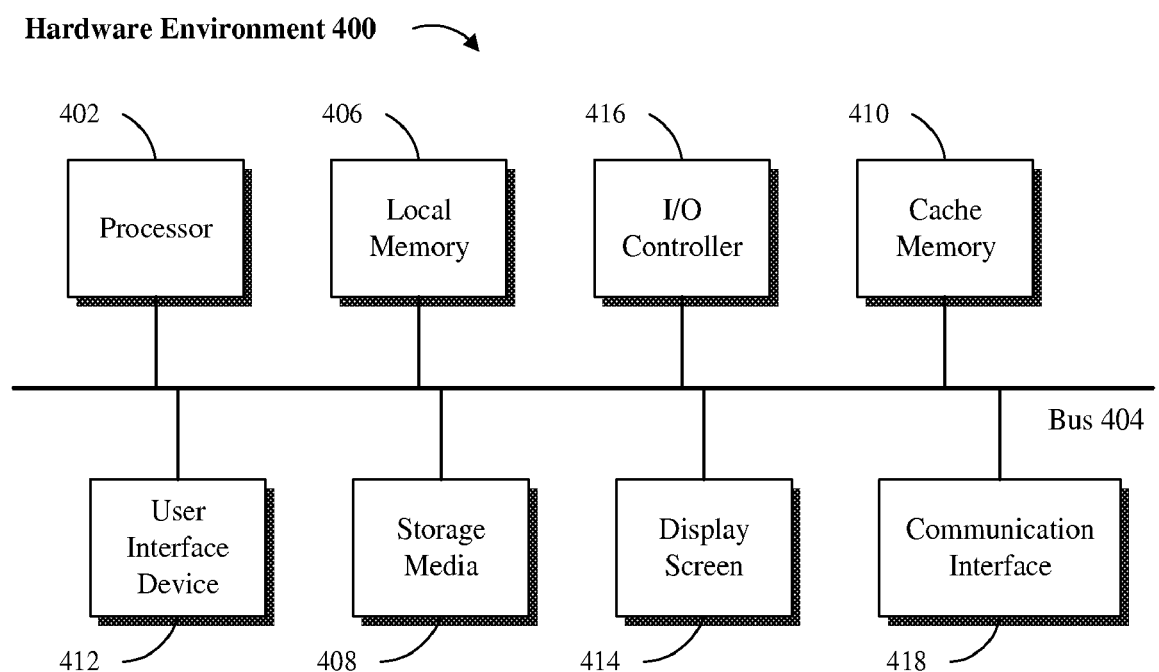
FIGS. 4 and 5 are block diagrams of hardware and software environments in which a system of the present invention may operate, in accordance with one or more embodiments.
Figure 5:
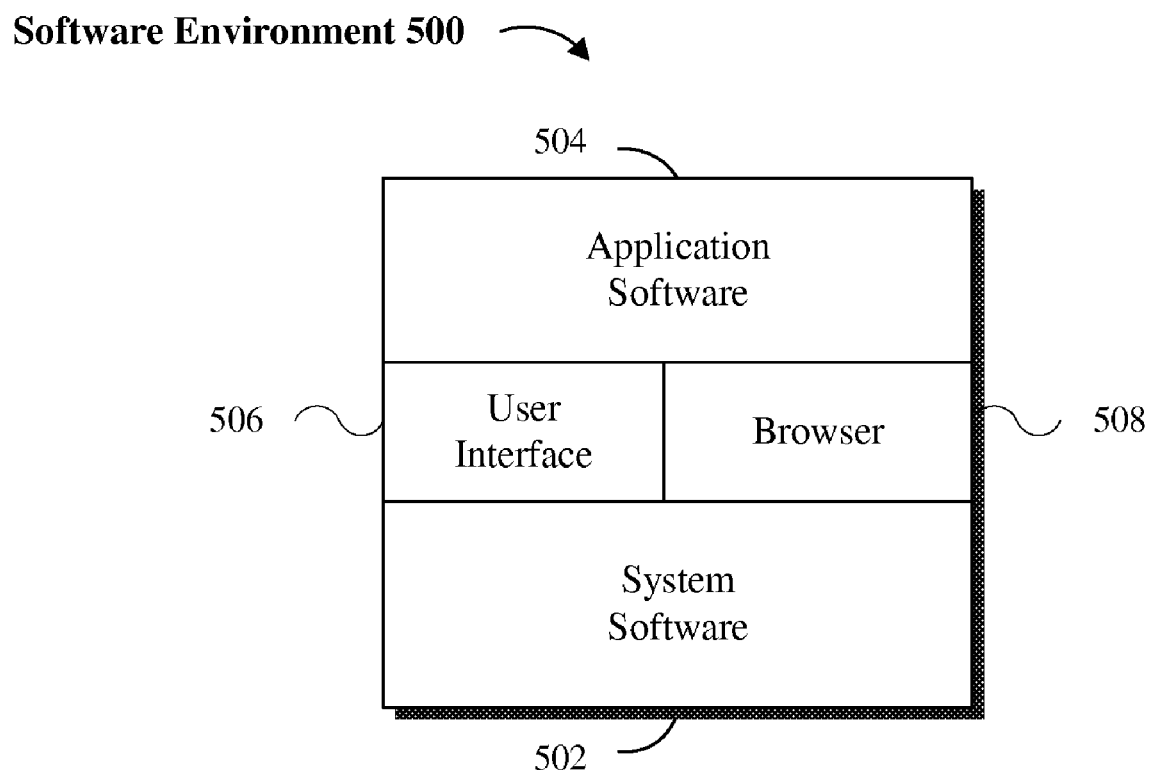

Referring to FIGS. 4 and 5, a computing system environment in accordance with an exemplary embodiment is composed of a hardware environment 400 and a software environment 500. The hardware environment 400 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 500 is divided into two major classes comprising system software 502 and application software 504. System software 502 comprises control programs, such as the operating system (OS) and information management systems that instruct the hardware how to function and process information.

In one embodiment, software applications that performed the above noted processes and functions may be implemented as system software 502 and application software 504 executed on one or more hardware environments to optimize the automated derivation of response time service level objectives. Application software 504 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 4, an embodiment of the system software 502 and application software 504 can be implemented as computer software in the form of computer readable code executed on a data processing system such as hardware environment 400 that comprises a processor 402 coupled to one or more computer readable media or memory elements by way of a system bus 404. The computer readable media or the memory elements, for example, can comprise local memory 406, storage media 408, and cache memory 410. Processor 402 loads executable code from storage media 408 to local memory 406. Cache memory 410 provides temporary storage to reduce the number of times code is loaded from storage media 408 for execution.

A user interface device 412 (e.g., keyboard, pointing device, etc.) and a display screen 414 can be coupled to the computing system either directly or through an intervening I/O controller 416, for example. A communication interface unit 418, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 400 may not include all the above components, or may comprise other components for additional functionality or utility. For example, hardware environment 400 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 418 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 5, system software 502 and application software 504 can comprise one or more computer programs that are executed on top of operating system 112 after being loaded from storage media 408 into local memory 406. In a client-server architecture, application software 504 may comprise client software and server software. For example, in one embodiment of the invention, client software is executed on computing systems 110 or 120 and server software is executed on a server system (not shown).

Software environment 500 may also comprise browser software 508 for accessing data available over local or remote computing networks. Further, software environment 500 may comprise a user interface 506 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method executable on one or more processors for maximizing a utility of a service contract by optimizing target response times for a performance service level objective, wherein a set of criteria are provided to ensure that performance requirements for the service are met, the method comprising:

determining or receiving one or more usage windows for providing a service, wherein each usage window is associated with a performance requirement and a time period;

one or more processor for extracting usage patterns for each usage window based on historical data provided from monitoring requests for service in each usage window;

one or more processor for extracting response time per transaction associated with said requests based on historical data provided from monitoring responses provided to said requests in each usage window; and one or more processors for calculating optimal probability (Pi) for breach in each usage window (Wi) for defined response times for a performance service level objective target value, wherein calculating the optimal probability (Pi) of breach in a usage window (Wi) is based on the usage pattern for the usage window (Wi) and target response times expected for the usage window (Wi).

2. The method of claim 1, further comprising:

receiving values for each success (si) and failure (bi) of a transaction run for each usage window as provided by a customer or calculated from historical data; and calculating the optimal probability (Pi) of breach in each usage window (Wi) such that the average net gain per transaction is maximized for the historical data, while the performance requirements are met according to a value utility function based on at least one of:

a) probability for breach in each usage window (Wi),
b) relative usage (Ai) for each usage window (Wi) as extracted from historical data, and
c) the value for each success and failure (si and bi) for each usage window.

3. The method of claim 2 further comprising optimizing the net gain per transaction via calculating the target response time for each usage window based on optimized probability of breach for each usage window.

4. The method of claim 2 further comprising optimizing average net gain per usage interval divided into usage window such that the failure rate in each usage window is maximized without the success rate falling below a predefined threshold.

5. The method of claim 1, further comprising employing probability (Pi) of breach in each usage window (Wi) and target response times that were calculated for historical transaction runs data; and applying the derived values to predict success/failure rates for future transaction runs.

6. The method of claim 1, wherein calculating optimal probability(Pi) for breach response times for a performance service level objective target value in each usage window (Wi) is further based on whether a defined breach budget for an entire evaluation interval is exceeded.

7. The method of claim 1, wherein calculating optimal probability(Pi) for breach response times for a performance service level objective target value in each usage window (Wi) is further based on whether denial of service effects in all windows are avoided.

8. The method of claim 1, wherein calculating optimal probability (Pi) for breach response times for a performance service level objective target value in each usage window (Wi) is further based on whether Pi values are used to determine the associated target response times for each usage window i.

9. The method of claim 1, further comprising testing ability of a system to predict and meet the performance service level objective in future time intervals, based on a success level trigger history selection mechanism such that with new historical data the prediction power is improved.

10. A system comprising one or more processors for maximizing a utility of a service contract by optimizing target response times for a performance service level objective, wherein a set of criteria are provided to ensure that performance requirements for the service are met, the method comprising:

a logic unit for determining or receiving one or more usage windows for providing a service, wherein each usage window is associated with a performance requirement and a time period;

a logic unit for extracting usage patterns, using one or more processors, for each usage window based on historical data provided from monitoring requests for service in each usage window;

a logic unit for extracting response time, using one or more processors, per transaction associated with said requests based on historical data provided from monitoring responses provided to said requests in each usage window; and a logic unit for calculating optimal probability (Pi) for breach in each usage window (Wi) for defined response times for a performance service level objective target value, wherein calculating the optimal probability (Pi) of breach in a usage window (Wi) is based on the usage pattern for the usage window (Wi) and target response times expected for the usage window (Wi).

11. The system of claim 10, further comprising:

a logic unit for receiving values for each success (si) and failure (bi) of a transaction run for each usage window as provided by a customer or calculated from historical data; and a logic unit for calculating the optimal probability (Pi) of breach in each usage window (Wi) such that the average net gain per transaction is maximized for the historical data, while the performance requirements are met according to a value utility function based on at least one of:

a) probability for breach in each usage window (Wi),
b) relative usage (Ai) for each usage window (Wi) as extracted from historical data, and
c) the value for each success and failure (si and bi) for each usage window.

12. The system of claim 11 further comprising a logic unit for optimizing the net gain per transaction via calculating the target response time for each usage window based on optimized probability of breach for each usage window.

13. The system of claim 11 further comprising optimizing average net gain per usage interval divided into usage window such that the failure rate in each usage window is maximized without the success rate falling below a predefined threshold.

14. The system of claim 11, further comprising employing probability (Pi) of breach in each usage window (Wi) and target response times that were calculated for historical transaction runs data; and applying the derived values to predict success/failure rates for future transaction runs.

15. The system of claim 11, wherein calculating optimal probability for breach (Pi) response times for a performance service level objective target value in each usage window (Wi) is further based on whether a defined breach budget for an entire evaluation interval is exceeded.

16. The system of claim 11, wherein calculating optimal probability (Pi) for breach response times for a performance service level objective target value in each usage window (Wi) is further based on whether denial of service effects in all windows are avoided.

17. A computer program product comprising a non-transitory computer useable medium having a computer readable program, wherein the computer readable program when executed on a computer causes the computer to:

determine or receive one or more usage windows for providing a service, wherein each usage window is associated with a performance requirement and a time period;

extract usage patterns for each usage window based on historical data provided from monitoring requests for service in each usage window;

extract response time per transaction associated with said requests based on historical data provided from monitoring responses provided to said requests in each usage window; and calculate optimal probability (Pi) for breach in each usage window (Wi) for defined response times for a performance service level objective target value, wherein calculating the optimal probability (Pi) of breach in a usage window (Wi) is based on the usage pattern for the usage window (Wi) and target response times expected for the usage window (Wi).

18. The computer program product of claim 17, further comprising:

receiving values for each success (si) and failure (bi) of a transaction run for each usage window as provided by a customer or calculated from historical data; and calculating the optimal probability (Pi) of breach in each usage window (Wi) such that the average net gain per transaction is maximized for the historical data, while the performance requirements are met according to a value utility function based on at least one of:

a) probability for breach (Pi) in each usage window (Wi),
b) relative usage (Ai) for each usage window (Wi) as extracted from historical data, and
c) the value for each success and failure (si and bi) for each usage window.

19. The computer program product of claim 18 further comprising optimizing the net gain per transaction via calculating the target response time for each usage window based on optimized probability of breach for each usage window.

20. The computer program product of claim 18 further comprising optimizing average net gain per usage interval divided into usage window such that the failure rate in each usage window is maximized without the success rate falling below a predefined threshold.

* * * * *